US010360265B1

(12) United States Patent
Agarwal

(10) Patent No.: US 10,360,265 B1
(45) Date of Patent: Jul. 23, 2019

(54) USING A VOICE COMMUNICATIONS DEVICE TO ANSWER UNSTRUCTURED QUESTIONS

(71) Applicant: A9.com, Inc., Palo Alto, CA (US)

(72) Inventor: Manoj Kumar Agarwal, Cupertino, CA (US)

(73) Assignee: A9.COM, INC., Palo Alto, CA (US)

( * ) Notice: Subject to any disclaimer, the term of this patent is extended or adjusted under 35 U.S.C. 154(b) by 194 days.

(21) Appl. No.: 15/250,506

(22) Filed: Aug. 29, 2016

(51) Int. Cl.
*G06F 16/00* (2019.01)
*G06F 16/9032* (2019.01)
*G10L 15/18* (2013.01)
*G10L 15/22* (2006.01)
*G06F 16/248* (2019.01)
*G06F 16/2455* (2019.01)
*G06F 16/2452* (2019.01)
*G06F 16/2457* (2019.01)

(52) U.S. Cl.
CPC ...... *G06F 16/90332* (2019.01); *G06F 16/248* (2019.01); *G06F 16/2455* (2019.01); *G06F 16/24522* (2019.01); *G06F 16/24578* (2019.01); *G10L 15/1815* (2013.01); *G10L 15/1822* (2013.01); *G10L 15/22* (2013.01)

(58) Field of Classification Search
None
See application file for complete search history.

(56) References Cited

U.S. PATENT DOCUMENTS

| 9,679,568 | B1* | 6/2017 | Taubman | G10L 15/30 |
| 2004/0044727 | A1* | 3/2004 | Abdelaziz | H04L 61/3065 709/203 |
| 2007/0061420 | A1* | 3/2007 | Basner | G06Q 10/10 709/217 |
| 2012/0117005 | A1* | 5/2012 | Spivack | G06F 17/30654 706/11 |
| 2015/0169606 | A1* | 6/2015 | Zhu | G06F 17/30646 707/706 |
| 2015/0293970 | A1* | 10/2015 | Li | G06F 17/3064 707/722 |
| 2016/0055259 | A1* | 2/2016 | Ghanekar | G06F 17/30719 707/706 |
| 2017/0357661 | A1* | 12/2017 | Hornkvist | G06F 17/30392 |

* cited by examiner

*Primary Examiner* — Son T Hoang
(74) *Attorney, Agent, or Firm* — Hogan Lovells US LLP

(57) ABSTRACT

Approaches provide for a speech driven question and answer service that uses a voice communications device to find information in which the user is interested in in response to a spoken question. For example, a voice communications device can receive a question for which an answer is desired and speak back a relevant answer. In this example, audio input data that includes the question can be received by the voice communications device. The audio input data can be analyzed to identify the question and the question can be used to query an index of stored questions to determine a set of candidate questions best matching the user's question. The candidate questions are associated with answers, and one or more answers can be combined, summarized, refined, or otherwise processed. Thereafter, the voice communications device can provide (e.g., speak back to the user) the most relevant answer(s) to the user or a modified version of the answer(s) (e.g., a summary of the answer(s), a tailored version of the answer(s), etc.)

19 Claims, 8 Drawing Sheets

US 10,360,265 B1

USING A VOICE COMMUNICATIONS DEVICE TO ANSWER UNSTRUCTURED QUESTIONS

BACKGROUND

As electronic devices become increasingly sophisticated, people are using such devices in new and interesting ways. For example, a user wanting an answer to a particular question might access a search engine in order to search for answers to the question. Unless the user knows an exact phrasing of the question, or the website that has the best answer, however, the user might have to search through hundreds of websites to attempt to locate the answer in which the user is interested. Some devices have adopted voice control where the device can perform various actions in response to a spoken question or instruction. In response to the question or instruction, these devices can provide information, music, audiobooks, news, weather, traffic, sports, control connected devices, etc. However, it can be difficult to present the results for a search request due to the limitations of the interface between a user and the voice-controlled device. For example, such devices may not have a display or may have smaller displays and it may be time consuming for a user to review a large list of search results. In some situations, these devices may send the information to another device to view the information. However, many users may find operating multiple devices time consuming and/or potentially frustrating, which can result in the user not finding the information in which the user is interested. Accordingly, there is a need to improve the interaction between users and voice controlled devices.

BRIEF DESCRIPTION OF THE DRAWINGS

Various embodiments in accordance with the present disclosure will be described with reference to the drawings, in which.

DETAILED DESCRIPTION

Figure 1A:
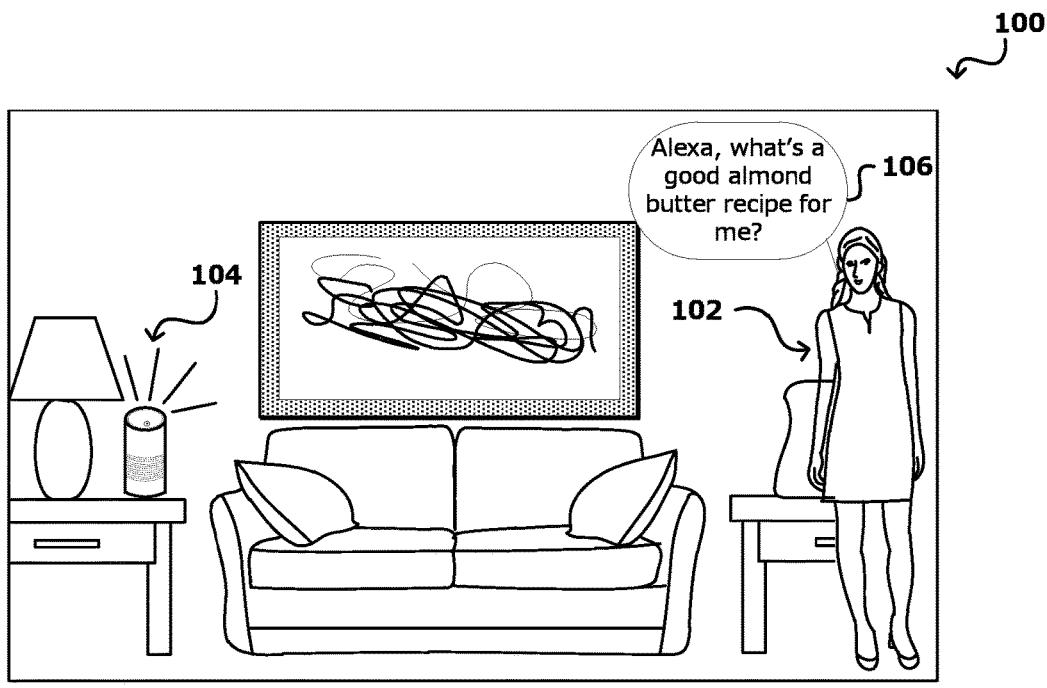
FIGS. 1A and 1B illustrate an example environment and example interactions between a user and a voice communications device in which aspects of the various embodiments can be utilized.

Systems and methods in accordance with various embodiments of the present disclosure may overcome one or more of the aforementioned and other deficiencies experienced in conventional approaches to performing voice searches with electronic devices. In particular, various approaches provide for a speech-driven question and answer service that uses a voice communications device to find information in which the user is interested in in response to a spoken question.

For example, and as described further herein, a voice communications device can perform various actions in response to a spoken question or instruction. In one such example, the voice communications device can receive a question for which an answer is desired and speak back a relevant answer. In this example, audio input data that includes the question can be received by the voice communications device and an application executing on the voice communications device or otherwise in communication with the voice communications device can analyze the audio input data to identify the question. The question can be used to query an index of stored questions to determine a set of candidate questions best matching the user's question based on a relevance function. The relevance function can consider the number of words in the question that match words in candidate questions to rank candidate questions that include more matching words higher, the ordering of words in the question to rank candidate questions more highly that contain words in the same order, etc. The candidate questions are associated with answers, and one or more answers can be combined, summarized, refined, or otherwise processed based a set of criteria in order to determine an answer most relevant to the user's question. The set of criteria can include the identity of the speaker, a user profile that includes information associated with the user, search history associated with the user, purchase history associated with the user, comments and/or reviews associated with the answers, a rating associated with the answers, among other such information. Thereafter, the voice communications device can provide (e.g., speak back to the user) the most relevant answer(s) to the user or a modified version of the answer(s) (e.g., a summary of the answer(s), a tailored version of the answer(s), etc.)

In certain embodiments, the provided answer may not be sufficient or of interest to the user, or the user may desire additional information. As such, the voice information associated with a subsequent user interaction may be used to provide additional information (e.g., related products to the question, advertisements, etc.), identify whether the answer is correct or if results from a different question-answer pair should be provided to the user. Accordingly, a user may provide voice feedback regarding the provided results that can be used to provide more relevant or additional results to the user. Additionally, the voice feedback may be used to improve answers provided in response to a question for future interactions. For instance, in the context of a particular search session, if a user repeats a question, the repeated question implies that the provided answer is incorrect and the answer returned to the user should change. Moreover, a subsequent user interaction (e.g., a follow-up question) may provide the system feedback regarding whether the answer was correct for the question. As such, the system can track and update relevance scores associated with each answer to question mappings and can improve the accuracy and efficiency of the search provider system based on user feedback. Accordingly, by using voice information from interactions with the user, a database of question to answer mappings may be improved over time to provide better answers in response to other questions.

Embodiments provide a variety of advantages. For example, by providing better answer matching to questions over time, the system can better match future questions with answers that are shown to be most relevant to user questions over a large number of users over time. Accordingly, fewer interactions are necessary for finding answers a user is interested in. As such, fewer resources of the computing system are necessary to find an answer to a question. Additionally, related information (e.g., related products, advertisements) and other information of interest can be provided to a user. Further, embodiments provide improvements to user interfaces where the ability to provide a large amount of information is limited. For example, embodiments may be used to improve user interfaces for a voice communications device that reads search results to a user or a watch with a very small display that can only provide a small number of results to a user at a time. As such, embodiments improve the ability for a system to provide relevant answers to a user based on a question.

Various other functions and advantages are described and suggested below in accordance with the various embodiments.

FIG. 1A illustrates an example environment 100 where a user 102 is interacting with a voice communications device 104. Although a voice communications device (e.g., Amazon Echo) is shown, it should be understood that various other types of electronic devices that are capable of receiving electronic messages can be used in accordance with various embodiments discussed herein. These devices can include, for example, portable computing device, notebook computers, ultrabooks, tablet computers, mobile phones, personal data assistants, video gaming consoles, televisions, set top boxes, smart televisions, portable media players, and wearable computers (e.g., smart watches, smart glasses, bracelets, etc.), display screens, displayless devices, other types of display-based devices, smart furniture, smart household devices, smart vehicles, smart transportation devices, and/or smart accessories, among others. A voice communications device includes, for example, any device having a microphone or other component configured to generate audio data from sound in the frequency range in which humans communicate. As will be described further herein, voice communications devices include devices that utilize a wakeword or other predetermined sound profile to activate some functionality (e.g., send data to a remote device, such as audio input data for speech analysis) as well as button-activated devices that utilize a button (graphical, physical, or both) to enable some audio-related functionality (e.g., a sound-capturing and sending mode).

In this example, user 102 can speak a request within an environment where the voice communications device 104 is located. The request may be any question, inquiry, instruction, phrase, or other set of one or more words/sounds. For example, the user may say, "Alexa, what's a good almond butter recipe for me?" In this example, the word "Alexa" has a special connotation, in that it may be referred to as a wakeword, or activation word (the wakeword would be a different word, or a particular phoneme or a particular sound, such as the sound made by clapping or snapping your fingers). In particular, a wakeword may be detected within audio input data detected by one or more microphones located on the voice communications device. Persons of ordinary skill in the art will recognize, however, that the one or more microphones may alternatively be located on a separate device in communication with the voice communications device. In some embodiments, after the wakeword is detected, the voice communications device may begin interpreting and analyzing audio input data until no more speech is detected.

In general, the voice communications device 104 constantly listens for the wakeword and is otherwise inactive. Once the wakeword is recognized, the voice communications device switches from a passive mode to an active mode. It should be noted that the wakeword does not have to be the first word or sound in a given sentence or request. The voice communications device can be configured such that it can record and store a limited amount of audio input data that should, in most instances, be the amount of time needed to speak a sentence or more. Accordingly, even if a wakeword is recognized in the middle or end of a sentence, the voice communications device will have retained the entire sentence which can then be analyzed by backend servers to determine what is being requested.

An application executing on the voice communications device or otherwise in communication with the voice communications device, can analyze the user's speech that includes audio input data 106 to perform at least one function. The functions can include, for example, performing a search for content matching a user's search query, sending an electronic message (e.g., a text message or a voice message) initiating a phone call, answering questions, playing music, reading audiobooks, controlling connected devices via voice commands/instructions, among other such functions. In this example, the user 102 is providing a search query to the voice communications device in order to find a recipe. In some embodiments, the search results may be read back to the user by the voice communications device or may be transmitted to a registered computing device (not shown) associated with the user 102. For example, a text message can be sent with the search results to the user. It should be noted that the other types of messages can be provided to the user's computing device as well, which may include voice messages, video messages, for example.

The voice communications device can be associated with a customer account provided by a service provider. The customer account can include one or more profiles, e.g., one or more family member profiles or other profiles, where each profile can be associated with a telephone number, preferences, access rights, and other information, and may share certain account settings as may include payment information (same credit card), address, message allotment, etc. In the situation where one of the members desires to find one or more entities of interest (e.g., a service provider, a location, a type of subject matter, or any other information related to content that may be stored within a database), the member can activate the voice communications device, for example, using a wakeword, announce who they are, and then speak the search query. Announcing who they are can cause the device to load the appropriate member profile and corresponding preferences, access rights, etc. In various embodiments, rather than have a member announce who they are, the voice communications device can automatically determine the member speaking using speech analysis software. For example, an application executing on the voice communications device or otherwise in communication with the device can analyze the speaker's voice to determine an identity of the speaker and associated profile. Based on the identity of the speaker, the appropriate member profile and corresponding preferences, access rights, etc. can be used. It should be noted that other approaches can be implemented to login to a particular profile. For example, each profile may be logged into by, for example, saying the wakeword then a special keyword/phrase (e.g., sign in as Jane) and/or by biometrics (i.e., speaker identification based on sound of voice and, if camera is available, facial recognition or, if fingerprint scanner, fingerprint ID), among other such approaches.

In this example, the customer account can be associated with a user profile associated with user 102. The service provider can provide an internet-based voice service as well as other services. The voice service can receive and can analyze audio input data using speech recognition software and/or other audio analysis software to determine an action to perform based on the received audio input data. In this example, the user 102 is attempting to search for a recipe. To initiate the search, the user 102 has spoken the question "what's a good almond butter recipe for me?" which informs the voice communications device as to the subject matter they are searching for (e.g., almond butter), a subject matter limitation (e.g., "recipe"), and a person to provide the results to (e.g., "me").

For example, in response to the user 102 speaking the phrase "what's a good almond butter recipe for me?," audio input data 106 that includes the phrase is received at the voice communications device 104 and an application executing on the voice communications device or otherwise in communication with the voice communications device can analyze the audio input data 106. For example, the contents of the audio input data may be streamed to a backend server (see FIG. 7 for further explanation) such that at least a portion of the audio input data can be received by the backend server and analysis can begin on that portion and any subsequent portions immediately upon receipt. In particular, the backend server can begin processing one or more portions of the audio input data prior to the user having completed making the instructions. Thus, the backend server can start analyzing whatever portion of the audio input data it received through a variety of techniques such as automatic speech recognition (ASR) and natural language understanding (NLU) to convert the audio input data into a series of identifiable words, and then to analyze those words in order to interpret the meaning of the request from the user. The backend server can utilize ASR techniques to recognize the spoken words that were recorded and stored in the MP3 data and to translate them into known text that can then be analyzed by NLU techniques to attempt to decipher the meaning of the request from user. Any suitable computer implemented speech-to-text technique may be used to convert the received audio signal(s) into text, such as SOFTSOUND speech processing technologies available from the Autonomy Corporation, which is headquartered in Cambridge, England, United Kingdom. In some embodiments, one or more filters may be applied to the received audio input data to reduce or minimize extraneous noise, however this is not required. In this example, analyzing the audio input data 106 can include determining a search query "almond butter recipe," an intended recipient "me," and an instruction "what is," to identify the search query and provide search results in response to the search query. The backend server can then perform a search based on the search query, obtain search results, and provide the most relevant search results to the user. Note that in some embodiments, the search results may be read back to the user through the voice communications device or may be provided to a user's computing device. It should be noted that although a person is illustrated as initiating the search query, any sending entity (i.e., any person, electronic device, internet-based service, etc.) can initiate the search query. Further, as would be understood to one skilled in the art, the audio input data can be analyzed for any one of a number of different functions, wherein submitting a search query is just one of those functions.

Figure 1B:
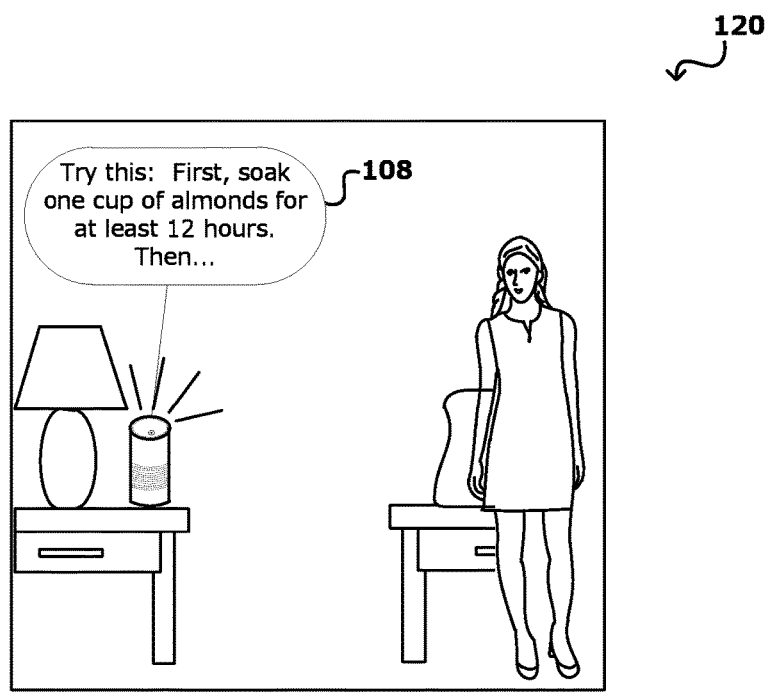

As shown in the example environment 120 focusing on the user and the voice communications device of FIG. 1B, the voice communications device 104 can provide an answer 108 associated with the search query "what's a good almond butter recipe for me?" Because the voice communications device shown in FIG. 1B does not have a large display (or no display) for providing search results to a user, a large set of matched search results obtained by the backend server computer that performs the search may be limited to a smaller tailored set of search results that can be easily provided to a user through digital voice playback. For example, the search for "what's a good almond butter recipe for me" may result in hundreds of search results based on a search of one or more data stores of content of the search provider. However, the service provider may know based on the identity of the speaker, a user profile that includes information associated with the speaker, search history, purchase history, among other such information which recipes are most likely to match with the search query. Accordingly, instead of providing a list of recipes based on individual entry similarity to the search query, recipes may be extracted from the matching search results and refined to determine which recipe is most likely related to the search query. For example, as shown in FIG. 1B, the voice communications device provides a recipe the user is likely to be interested in.

Figure 2:
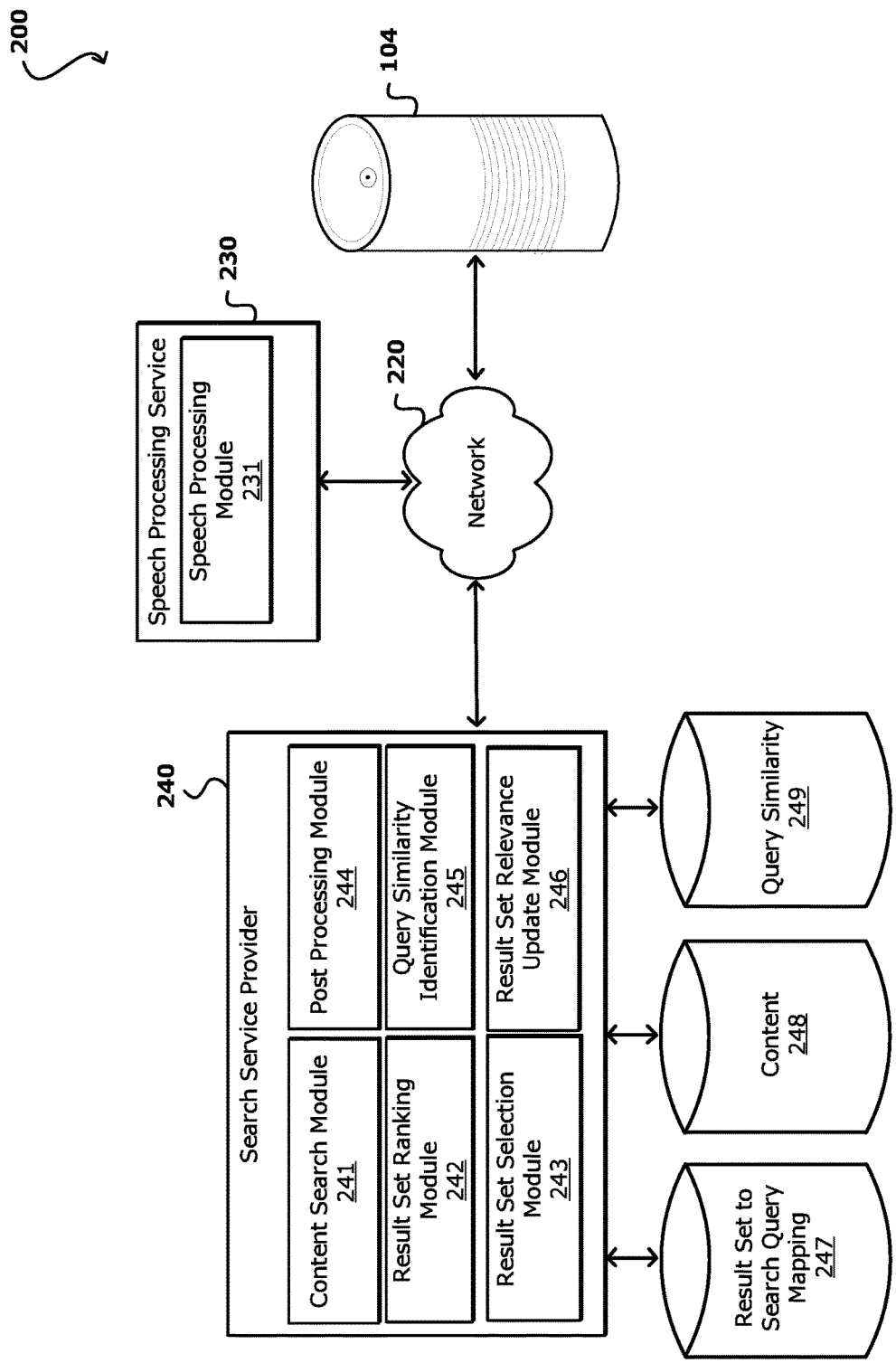
FIG. 2 illustrates a block diagram of an example system for using voice information to perform a voice search in accordance with various embodiments.

FIG. 2 illustrates a block diagram of an example system 200 for using voice information to perform a voice search in accordance with various embodiments. In this example, system 200 shows example data flows between a speech processing service 230, a search service provider 240, and a voice communications device 104 that is providing audio input data corresponding to user utterances. It should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein. The system includes a voice communications device 104, a speech processing service 230, and a search service provider 240 (which could be provided through one of the applications servers explained in further detail in reference to FIG. 7) that communicate through a network 220.

In this example, a user may make an utterance, such as an utterance that includes a spoken command for the speech processing service 230 to perform some task, such as a request to perform a search query. The user may speak the utterance into (or in the presence of) the voice communications device 104. The voice communications device 104 can correspond to a wide variety of electronic devices. In some embodiments, the voice communications device 104 may be a computing device that includes one or more processors and a memory which may contain software applications executed by the processors. The voice communications device 104 may include or be in communication with an audio input component for accepting speech input on which to perform speech recognition, such as a microphone. The voice communications device 104 may also include or be in communication with an output component for presenting responses or other information from the speech processing service, such as a speaker. The software of the voice communications device 104 may include hardware components and/or software for establishing communications over wireless communication networks or directly with other computing devices.

The speech processing service 230 can correspond to an online service that performs speech processing operations associated with the voice communications device 104. The speech processing service 230 may include a speech processing module 231 as well as other processing modules.

The speech processing module 231 can receive audio input data including a user utterance via network 220 from the voice-enabled communication device 104. A user may use the voice communications device 104 to submit utterances, receive information, and initiate various processes, either on the voice communications device 104 or at the speech processing module 231. For example, as described, the user can issue spoken commands to the voice communications device 104 in order to request an answer to a question.

The speech processing module 231 may be configured to perform automatic speech recognition (ASR) on audio data regarding user utterances, natural language understanding (NLU) on transcriptions generated by the ASR processing. Applying contextual rules to current NLU results based on prior interpretations and dialog acts, a natural language generation ("NLG") module that converts certain dialog acts into user-understandable communications (e.g., text that can be "read" to the user by a text-to-speech or "TTS" component), among other such processes. The speech processing module 231 may be performed by any number of server computing devices, desktop computing devices, mainframe computers, and the like. Each individual device may implement one of the services of the speech processing module 231. In some embodiments, the speech processing module 231 can include several devices physically or logically grouped together to implement one of the modules or components of the speech processing module 231. For example, the speech processing module 231 can include various modules and components combined on a single device, multiple instances of a single module or component, etc. In one specific, non-limiting embodiment, the speech processing module 231 may include a server or group of servers configured with ASR and/or NLU processing capabilities, a server or group of servers configured with a context interpreter processing and/or text-to-speech processing, etc. In multi-device implementations, the various devices of the speech processing module 231 may communicate via an internal communication network, such as a corporate or university network configured as a local area network ("LAN") or a wide area network ("WAN"). In some cases, the devices of the speech processing module 231 may communicate over an external network, such as the Internet, or a combination of internal and external networks.

In some embodiments, the features and services provided by the speech processing module 231 may be implemented as web services consumable via a communication network. In further embodiments, the speech processing module 231 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the features of the speech processing module 231 may be integrated into the voice communications device 104 such that network connection and one or more separate computing systems are not necessary to perform the processes of the present disclosure. For example, a single voice communications device 104 may include the microphone, an ASR module, an NLU module, a context interpreter, a text-to-speech module, or some combination thereof.

As described, users may submit utterances that may include various commands, requests, and the like. A microphone may capture utterance audio and provide it (or data derived therefrom) to the speech processing module 231 of the speech processing service 230. The speech processing module 231 may generate ASR results for the utterance, such as a w-best list of transcriptions. Each transcription or portion thereof may be associated with some score, such as a confidence score or a likelihood that the transcription or portion thereof is correct. The w-best list or some other type of results may be NLU processed so that the user's intent may be determined. A w-best list of interpretations (e.g., intents) may be determined or generated by the NLU processing. The NLU results (e.g., modify individual interpretations, filter interpretations, re-score or re-rank interpretations, etc.) may be context interpreted to identify a search query from the audio input data.

The search service provider 240 can correspond to an online service that provides access to content associated with a plurality of entities including, question and answer websites, data broker websites, social networks, message boards, forums, blog or personal websites, business websites, ecommerce websites, business directory websites, job board websites, nonprofit and religion websites, portfolio websites, online community websites, auction websites, knowledgebase/wiki websites, school or college websites, periodical websites among other such websites and/or any other organizations or providers that may be of interest to a user. In one example, the search service provider 240 can be associated with a question and answer platform. In the example shown in FIG. 2, the search service provider 240 may include a content search module 241, a result set ranking module 242, a result set selection module 243, a search query similarity identification module 245, a post processing module 244, and a result set relevance update module 246. The search service provider 240 may also be configured to communicate with a result set to search query mapping data store 247, a content data store 248, and a query similarity database 249.

The content search module 241 may include a software sub-module that is configured to perform a search of the content data store 248 in response to a search query received from the voice communications device 104. The search query may be received in the form of a search request. An example search request can be a question for which an answer is desired. Other search queries include, for example, any information that may helpful for performing the functionality described herein such as a session indicator, an identity of the speaker, etc. The content search module 241 may be configured to receive a search request from the speech processing service associated with the voice communications device 104 and may identify a search query. Alternatively or additionally, in some embodiments, the content search module 241 may be configured to receive audio input data in the search request from the voice communications device 104 and may perform automatic speech recognition (ASR) and/or natural language processing (NLP) to identify the search query from the audio input data. For example, the content search module 241 may call the speech processing service in order to process the audio input data.

In accordance with various embodiments, the result can be provided to the content search module 241 as a search query to initiate searching one or more databases for matching content, where the matching content can include questions and associated answers. For example, the content search module 241 can obtain the search query from the speech processing module 231 of the search processing service 230 and may search the content data store 248 for matching or similar database entries associated with one or more words within the search query. In certain embodiments, the search processing service 230 can communicate with a question and answer website, content provider, electronic marketplace that includes a question and answer service, or other website way such information can be determined to provide an answer to a user submitted question.

In accordance with various embodiments, the content data store 248 can be populated in a number of ways. In one example, questions and answers can be provided by users of the service. For example, users of the service can post questions for which an answer is desired. The posted questions and answers can be stored in content data store 248 or other such repository. In another such example, moderators of the service can generate and curate questions and answers, and those questions and answers can be stored in content data store 248. In yet another example, questions can be submitted to an answer service. The answer service can be utilized to determine content for the content data store 248 using any of the approaches described herein, such as crowd sourced approaches, software-based approaches, etc. In yet another example, in certain situations, an answer may not be determined in response to a user's question. That is, a user asks a question and an answer to that question is not determined. In this situation, as part of the answer service or other such service, the question can be stored to the content data store 248 and an answer can be determined as described herein. For example, the question can be provided to a community of users and/or otherwise crowed sourced for an appropriate answer. Moderators, users, and/or other authorized users can provide and/or review the answers to determine the most relevant answers. The most relevant answers (e.g., highest voted answer, moderator/user selected answer, etc.) can be associated with the question and stored in content data store 248. In yet another example, web crawlers and other such software can be utilized to search the internet to obtain and store question/answers pairs, user comments, and other such information in content data store 248.

The content data store 248 can be associated with an index of questions, answers, common search queries, time aggregated usage information about search queries, browse actions and individual products, metrics collected for keyword searches such as daily clicks, adds, purchases, order product sales among other indexed information. The index can be an inverted index or other such index. An inverted index is an index data structure storing a mapping from content, such as words or numbers, to its locations in a database file, or in a document or a set of documents. In another example, an inverted index consists of a list of all the unique words that appear in any document, and for each word, a list of the documents in which it appears. A document can be a JavaScript Object Notation (JSON) document or other data structure format, such as XML.

A result set of candidate questions with associated answers, comments, commentary, among other such information sorted by relevance to the search query may be returned from the one or more content data stores. Information about each of the search results within the result set may be returned to the content search module 241. For example, a source indication, a content identifier, a category, a description, a title, an address, a type of content entry, and any other relevant information may be returned along with the search result set. The result set may include a set of candidate questions matching the user's question. The questions can be sent to a result set ranking module 242 (e.g., answer ranking module) that can rank the candidate questions based on a relevance function in order to determine questions most relevant to the user's question.

For example, the result set ranking module 242 may receive the identified questions from the result set and may determine relevance scores associated with each question to search query mapping database 247. For example, in response to a search query for "what's a good almond butter recipe for me," a list of 30 matching search results may be returned ranked according to relevance scores to the search query. The search results may include almond butter recipes, recipes that use almonds, brands of almond butter to purchase, etc. Accordingly, the plurality of questions from the search results may be obtained and submitted to a result set to search query mapping database 247 to obtain question relevance scores associated with each of the identified questions. For instance, the result set ranking module 242 may search the result set to search query mapping database 247 to obtain relevance scores for a plurality of questions associated with "almond butter recipes." The result set to search query mapping database 247 may include a plurality of search queries and corresponding rankings of questions associated with each search query. The questions may be assigned manually or through computer learning algorithms that use a training set of search result entries and questions to search query mappings to classify search results and search result categories to search queries. For instance, the result set to search query mapping database 247 may include an entry for the search query "best almond butter recipes" and may return a set of questions ranked according to relevance scores associated with each of the rankings. For example, the question "best almond butter recipe" may have a relevance score of "0.932" and be ranked first while the question "where to buy almond butter ingredients" may have a relevance score of "0.876" and be ranked second. Particular brands of almond butter may each have a relevance score and may be ranked according to their relevance to the search query.

Additionally or alternatively, in some embodiments, the result set ranking module 242 may identify relevance scores for the search query before the content search module 241 performs a search of the content database 248. For instance, the result set ranking module 242 may search the result set to search query mapping database 247 for the highest ranked question associated with the search query "what's the best almond butter recipe for me" before searching the content database 248. As such, the result set ranking module 242 may determine that "what's the best almond butter recipes for me" is the highest ranked question for the search query and may pass the question to the content search module 241 to further limit the number of results that are obtained to only those associated with question. Accordingly, embodiments may implement the content searching and question ranking process through either obtaining the questions from the most relevant search results or may obtain the most relevant questions and then search the content database 248 for the most relevant search results associated with the most relevant questions.

Either way, a result set selection module 243 may obtain the ranked candidate questions and may select a set of the ranked candidate questions to be used to obtain a set of answers. In accordance with various embodiments, the answers are associated with the questions. The answers might be associated with user comments and/or user reviews that provide additional information. For example, the comments and/or user reviews might describe substitute products and/or procedures, similar products and/or procedures, user tips and tricks, as well as other information associated with the question and answer. For example, the user comments and/or user reviews might discuss other websites that have discussed a similar question and information from those websites can be used and/or summarized with the answer provided. In certain embodiments, the answers can be associated with a rating, and the rating information can be used in determining an answer to provide to the user. For example, the rating can be used to weight answers with a higher rating higher than answers with a lower rating. Thereafter, the answers, comments, etc. can be summarized, refined, or otherwise processed based on a set of criteria in order to determine an answer most relevant to the user's question. The set of criteria can include the identity of the speaker, a user profile that includes information associated with the user, search history associated with the user, purchase history associated with the user, comments and/or reviews associated with the answers, a rating associated with the answers, among other such information.

For example, a post processing module 244 may be configured to determine the most relevant answer by taking into consideration information included in a user profile. The information can include gender information, age information, personal preference information, search history information, purchase history information, etc. The post processing module can, for example, identify a user account associated with the voice communications device and apply a weight to each answer in the set of answers based at least in part on information associated with the user account. This can include matching information in the user profile with the answer and/or question associated with the answer. The weighted answers can then be ranked and the answer associated with the highest weight can be selected.

In some embodiments, the post processing module 224 can weight answers to questions based on where the identity of the source that provides the question/answer pair. For example, question/answer pairs determined from an authorized source can be weighted higher than question/answer pairs determined from other sources. Additionally or alternatively, question/answer pairs can be weighted higher than other question/answer pairs in the situation where a source includes information to support the question/answer pair in another source. This can include using comments, user reviews, or other information from one source to increase the weighting of question/answer pairs of another source.

In various embodiments, the post processing module 224 can aggregate answers from multiple sources and generate an aggregate or summary answer. For example, the post processing module or other such module can generate an answer that includes a first answer portion from a first answer associated with a first website and a second answer portion from a second answer associated with a second website. A sentence compression technique can be used to generate a summary of the first answer portion and the second answer portion and the summary of the first answer portion and the second answer portion to be presented to the user. Sentence compression is the task of summarizing a one or more sentences into a sentence, where the summarized sentence preserves the important parts of the other sentences and is grammatical. In summarizing the sentences, the post processing module can consider user profile information and other variables. Sentence compression can include a number of different approaches. Two approaches can include extraction and abstraction. Extractive methods work by selecting a subset of existing words, phrases, or sentences in the original text to form the summary. In contrast, abstractive methods build an internal semantic representation and then use natural language generation techniques to create a summary that is closer to what a human might generate. Such a summary might contain words not explicitly present in the original.

Thereafter, the voice communication device can provide (e.g., speak back to the user) the most relevant answer(s) to the user or a modified version of the answer(s) (e.g., a summary of the answer(s), a tailored version of the answer(s), etc.) In certain embodiments, the voice communications device can provide related information, such as products, services, advertisements, etc. It should be noted that the result set selection module 243 may also send a text message, tweet, or other communication to a device of the user with the set of results and the how the results are delivered may change based on the configuration of how the results are configured to be provided to the user. For instance, a user may have in their profile settings the preferred method of delivering results of search queries and the result set selection module 243 may identify a phone number, email address, or other identifying address information based on the profile settings in which to use to provide the first subset of search results.

As described, the provided answer may not be sufficient, of interest, or the user may have a follow-up question. As such, the voice information associated with a subsequent user interaction may be used to provide additional information, identify whether the answer is correct, or if results from a different question-answer pair should be provided to the user. Accordingly, a user may provide voice feedback regarding the provided results that can be used to provide more relevant results to the user. Additionally, the voice feedback may be used to improve answers provided in response to a question for future interactions. For instance, in the context of a particular search session, if a user repeats a question, the repeated question implies that the provided answer is incorrect and the answer returned to the user should change. Moreover, a subsequent user interaction (e.g., a follow-up question) may provide the system feedback regarding whether the answer was correct for the question. As such, the system can track and update relevance scores associated with each answer to question mappings and can improve the accuracy and efficiency of the search provider system based on user feedback. Accordingly, by using voice information from interactions with the user, a database of question to answer mappings may be improved over time to provide better answers in response to other questions in the future.

A session may be identified based on the amount of time between a response by a voice communications device 104 and an utterance by a user. For example, an amount of time between when results are provided and when the next audio input data is provided by the user may indicate whether a request is associated with the same session or a different session. For instance, the voice communications device 104 may stay awake for a predetermined amount of time (e.g., 2 minutes, 5 minutes, etc.) after providing a result set and if an utterance is not received from a user during that time, a new session may be started for the next utterance of the user. Thus, an end of the session may be determined by an amount of time between the first set of results being presented to the user of the device and the receiving of the second audio input data. Further, in some embodiments, a user may provide a voice input (e.g., saying a "session word") or a physical input (e.g., pressing a button) on the voice communications device 104 or a device in communication with the voice communications device to end a session and/or start a new session. Thus, the indication of whether a search query is associated with a new session or a previous session may be provided with the search request that is provided to the search service provider. For example, the search data may include the search query, the voice volume level, a session identifier (and/or indicator of whether a new session or not), and any other information that the search service provider may need to process the search query and perform the functionality described herein.

A query similarity identification module 245 may be configured to identify the similarity between search queries during a session with a user. The query similarity identification module 245 may determine the similarity between two queries through any suitable method. For example, the query similarity identification module 245 may calculate a search query similarity score by comparing the first search query and the second search query. For instance, in some embodiments, the query similarity identification module 245 may search a query similarity database 249 for both the first query and the second query and determine the distance between both queries. The query similarity database 249 may store a plurality of search queries as nodes within a hierarchical data structure and may be capable of calculating a distance between two different nodes to identify similarity between the queries. The distance between the first query and the second query may be used as the search query similarity score. The search query similarity score may be compared to a stored similarity score threshold that may be tailored to identify when two search queries are so similar that they are considered a repeated query. For instance, if the distance between the two search queries is above the threshold similarity distance that indicates a repeated query, the query similarity identification module 245 may determine the second search query is a repeat of the first search query. Other methods of analyzing and comparing similarity between search queries may be used including overlap between words and the analysis of known substitutes for inconsistencies between search queries. For example, a similarity score may be provided based the percentage of overlap and a measure of how often the differences between search queries are used interchangeably based on other search queries. Accordingly, any number of different methods may be used to identify a similarity score between queries and a threshold similarity score to indicate an appropriate level of similarity between the queries to be considered repeated queries.

A result set relevance update module 246 may be configured to update the relevance scores stored in the result set to search query mapping database 247 based on positive or negative feedback of users in response to one or more result sets. The result set relevance update module 246 may receive the results of the post processing module 244 and the query similarity identification module 245 and may determine whether the user has provided positive or negative feedback regarding a result set associated with a selected question for a search query. For example, the result set relevance update module 246 may increase a relevance score for a search query mapping associated with a particular search query and question where the result set relevance update module 246 determines that the user has provided positive feedback in response to a set of results. Likewise, if the result set relevance update module 246 receives an indication that the user has repeated a search query in response to a set of results associated with a particular question, the result set relevance update module 246 may decrease the relevance score stored for a particular search query and question. The amount of increase and/or decrease to the relevance score of a question in response to a particular negative or positive feedback event from a user may be limited but in the aggregate may allow the system to identify the best matching questions for a particular search query.

Figure 3A:
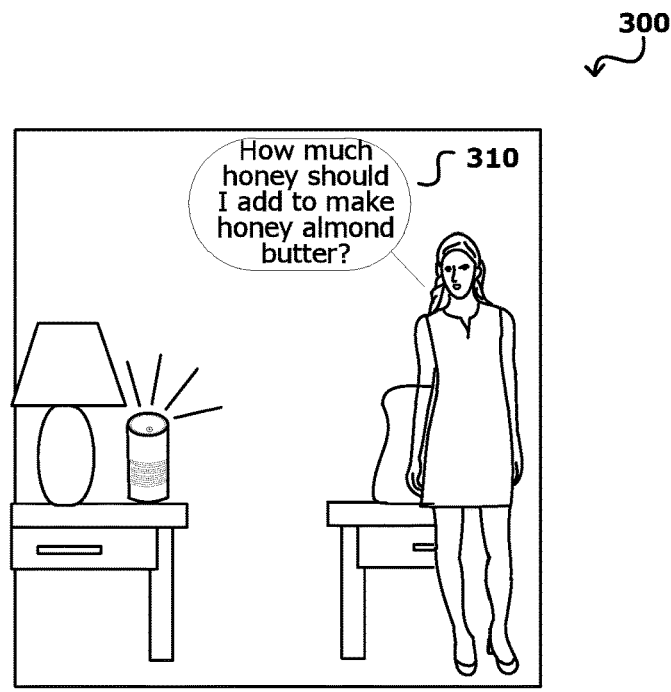
FIGS. 3A, 3B, 3C, and 3D illustrate an example environment and example interactions between a user and a voice communications device in which aspects of the various embodiments can be utilized.

In accordance with various embodiments, the user may be interested in a variation of the result (e.g., recipe or answer) provided. Accordingly, the user may ask a question associated with second audio input data 310 to indicate to the voice communications device the user is interested in a variation to the provided almond butter recipe. Accordingly, as shown in example 300 of FIG. 3A, the second audio input data 310 may include a user question "How much honey should I add to make honey almond butter?" Accordingly, the voice communications device may stop providing search results associated with the first search query and may determine the instruction associated with the second audio input data. The voice communications device may perform similar steps to identify the type of instruction and may send the second audio input request to the search service for a second search query to be performed.

Figure 3B:
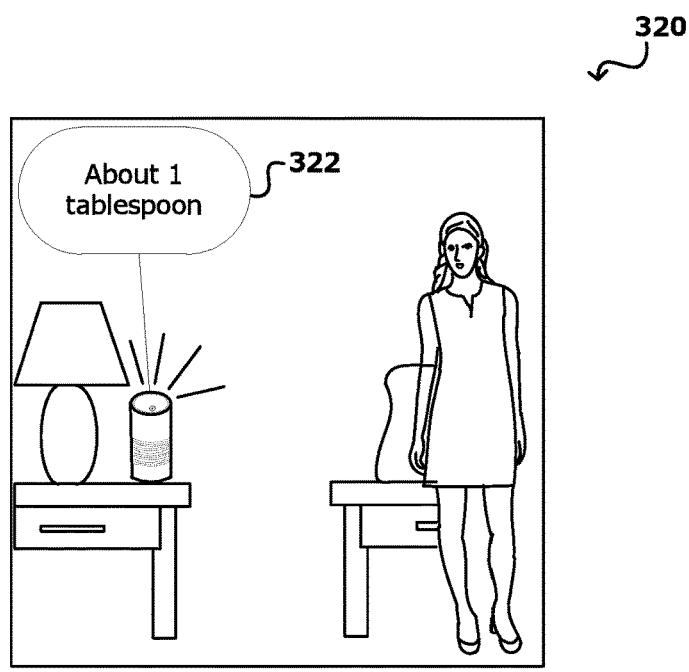

The search service may analyze the second audio input data to identify whether the second audio input data includes a similar search query to the first search query, such that the user is not requesting a completely different search. The search service may use the previously determined original search results to identify a second set of search results associated with the second question having a second highest relevance score to the search query to provide more relevant search results to the user. For example, as shown in example 320 of FIG. 3B, the voice communications device may read out a second set of search results 322 (e.g., "about 1 tablespoon").

In various embodiments, the user may engage in a dialog with the voice communications device. For example, the user can make a request to hear the next recipe. The user can indicate whether they like or dislike a current recipe, e.g., by saying thumbs up or thumbs down for the current recipe. The user can save the recipe. The user can ask to make a grocery list that includes ingredients of the recipe, among other such requests. In the situation where the user provides feedback indicating that they do not like the current recipe, the search service may decrease the relevance score and/or the rank of the mappings to the question "what's the best almond butter recipe." Thus, when the next search query related to "almond butter recipe" is received from a user, the search service may perform another ranking of questions related to the search query based on the relevance scores and a different answer may be provided. The amount of decrease of the relevance scores may be small or large depending on the number of requests and amount of feedback stored within the system. However, over time based on a large number of feedback responses, the system can learn which answers are preferred by users over others and can better match queries to search results.

Figure 3C:
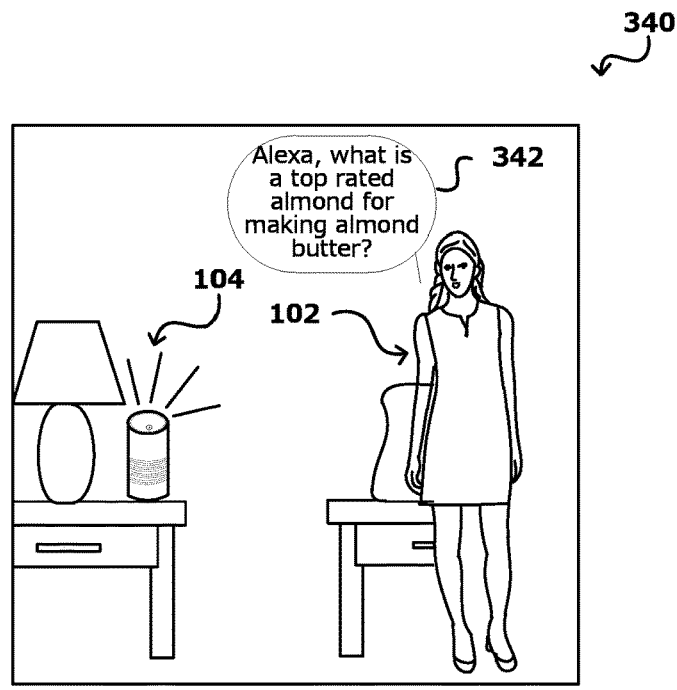

Moreover, the user may also provide audio input data that provides positive or neutral feedback which may be used to increase relevance scores of a category for a particular search query. For example, as shown in example 340 of FIG. 3C, a user may provide audio input data 342 that asks a further question about the result provided by the voice communications device. For instance, the user may provide an instruction including "Alexa, what is a top rated almond for making almond butter?" The search service may receive the audio input data, analyze the audio input data to determine an answer to the user's questions. Additionally, the search service may determine that the audio input data indicates that the previously provided search results are current and increase the relevance of the question/answer pair to the question "what is the best almond butter recipe?"

Figure 3D:
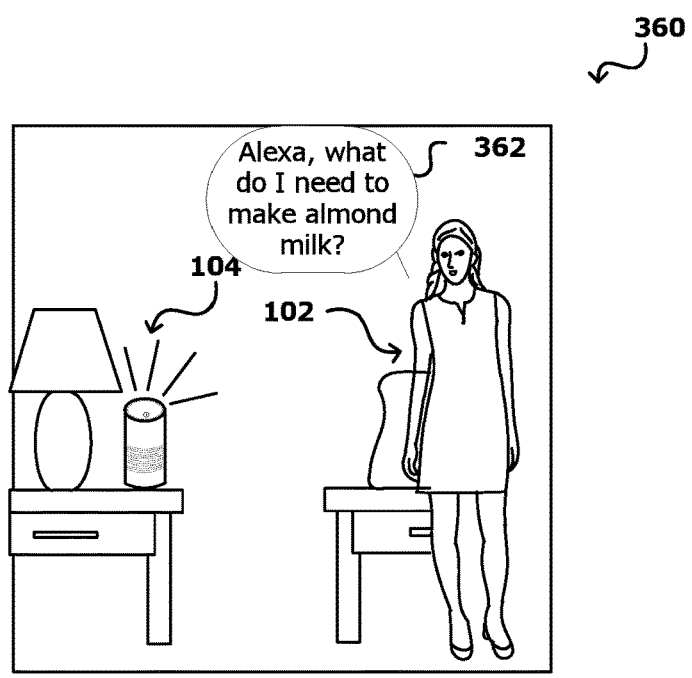

In accordance with an embodiment, as shown in example 360 of FIG. 3D, the user may be happy with the results and completely change the subject of a search query because they have the information they desired and are asking a new question. For example, the user may desire to know what products are useful in making almond butter. The user can say "Alexa, what do I need to make almond milk?" 362. Accordingly, the search service may identify the search query, that the search query is not similar to a previous search query, may determine that the search result of the previous search results was correct, then proceed to provide an answer to the current question. As such, there are multiple manners in which a search service may determine that the previous search category was correct. Thus, the search service may take such interactions as positive feedback for the relevance of the previously provided answer for the previously received search query. In embodiments, the search service may increase the relevance score for the previously provided answer associated with the search query. Accordingly, over time, the system incorporates the positive and negative feedback to update categories for each search query which results in the system identifying the best matching questions and answers for each query. Accordingly, embodiments may more quickly result in the correct search results being provided to users.

Figure 4:
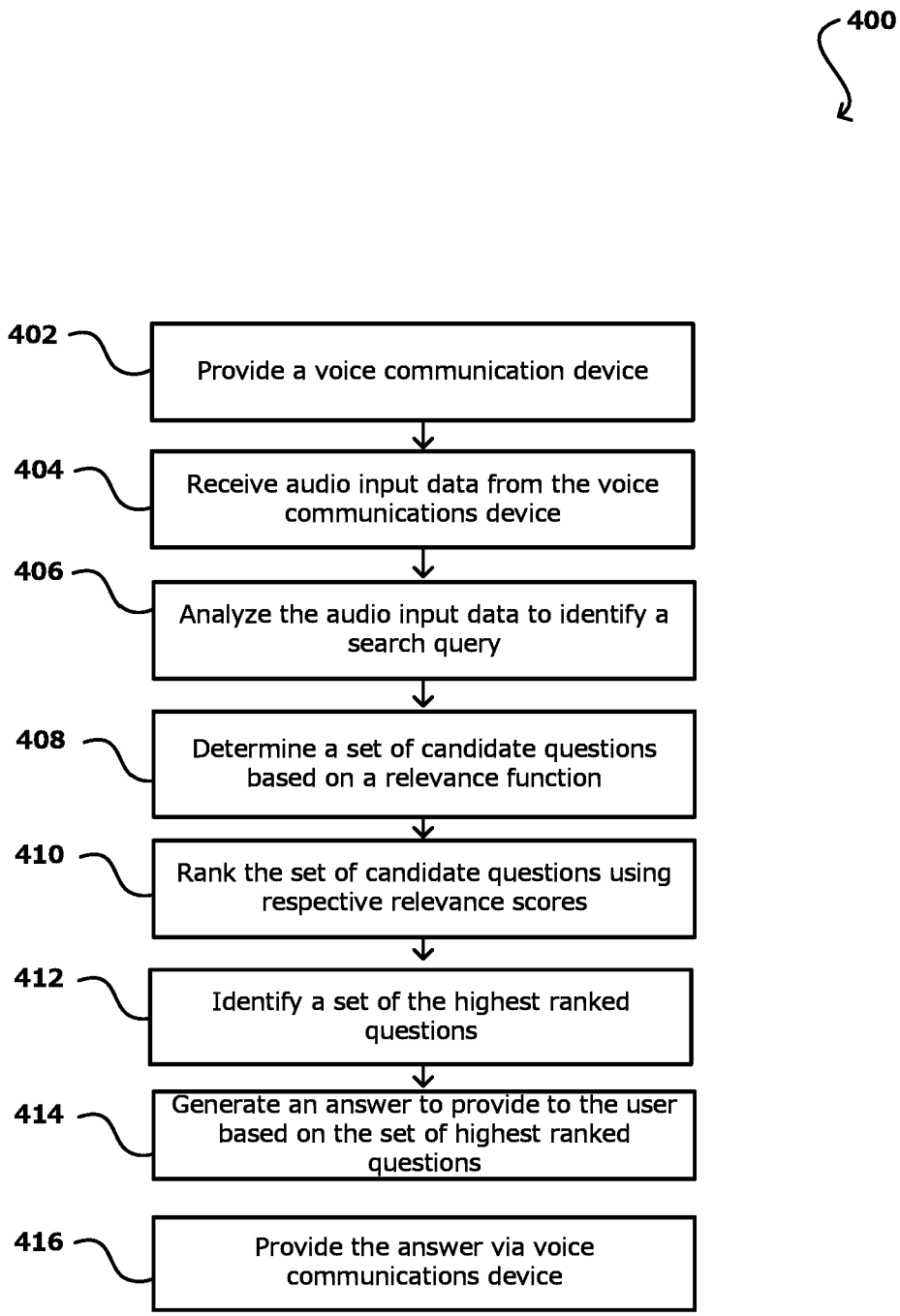
FIG. 4 illustrates an example process for using voice information to perform a voice search in accordance with various embodiments.

FIG. 4 illustrates an example process 400 for using voice information to influence the importance of search result categories during a search session between a voice communications device and a user in accordance with various embodiments. It should be understood that, for any process discussed herein, there can be additional, fewer, or alternative steps performed in similar or alternative orders, or in parallel, within the scope of the various embodiments unless otherwise stated. In this example, a voice communications device is provided 402. The voice communications device can be associated with a customer account provided by a service provider. The service provider can provide an internet-based voice service as well as other services. The voice service can receive and can analyze audio input data using speech recognition software and/or other audio analysis software to determine an action to perform based on received audio input data. The voice communications device can include one or more microphones that can capture voice or other audio input data, wherein an application executing on the voice communications device or otherwise in communication with the voice communications device can analyze the data to perform a function. The functions can include, for example, performing a search query, initiating a phone call, answering questions, playing music, reading audiobooks, controlling connected devices via voice commands, among other functions. In this example, a user (e.g., someone speaking to the voice communications device) is attempting to obtain information to find information in which the user is interested in such as an answer to a question. The process may start by a user uttering a wakeword to a voice-enabled communication device to wake up the voice communications device. The voice communications device receives 404 audio input data by a microphone of the voice communications device. The utterance may include an instruction. The instruction may include a search query related to a topic, subject, or entity in which the user is interested in identifying or learning more about.

The speech processing service of the service provider may include a speech processing service that may receive the audio input data from the voice communications device. The speech processing service of the service provider may analyze 406 the audio input to identify a search query includes a question. The speech processing service may identify the search query by performing automated speech recognition on the audio input data. The search query can include search terms that make up a question.

The service provider may include an application server related to a search service provider that may receive the search query. The search request may also include information related to whether the search request is part of a previous session and/or part of a new session between the user and the voice communications device. The search service provider may query an index using the search terms to determine 408 a set of candidate questions associated with the search query based on a relevance function. For example, in some embodiments, the search service may perform a search of a content database for matching search results (e.g., questions) associated with the search query and may extract answers from the search results to identify relevant answers. Querying the index can include identifying questions in the index that include a search term form the search query. The identified questions can be a set of candidate questions. A relevance score can be determined for each candidate question, for example, based on a number of search terms included in a respective candidate question, an order of the search terms to an order of the words in the candidate questions, etc.

The candidate questions can be ranked 410 based on respective relevance scores. The service provider may identify 412 a set of the highest ranked questions and may use the answers associated with the questions to generate 414 an answer to provide to the user. For example, as described, a question is associated with an answer. For set of highest ranked questions there would be a set of answers. The answers can be combined, summarized, refined, or otherwise processed based a set of criteria in order to determine an answer most relevant to the user's question, etc. The set of criteria can include the identity of the speaker, a user profile that includes information associated with the user, search history, purchase history, comments and/or reviews associated with the answers, a rating associated with the answers, among other such information. Thereafter, the voice communication device can provide 416 (e.g., speak back to the user) the most relevant answer(s) to the user or a modified version of the answer(s) (e.g., a summary of the answer(s), a tailored version of the answer(s), etc.)

Figure 5:
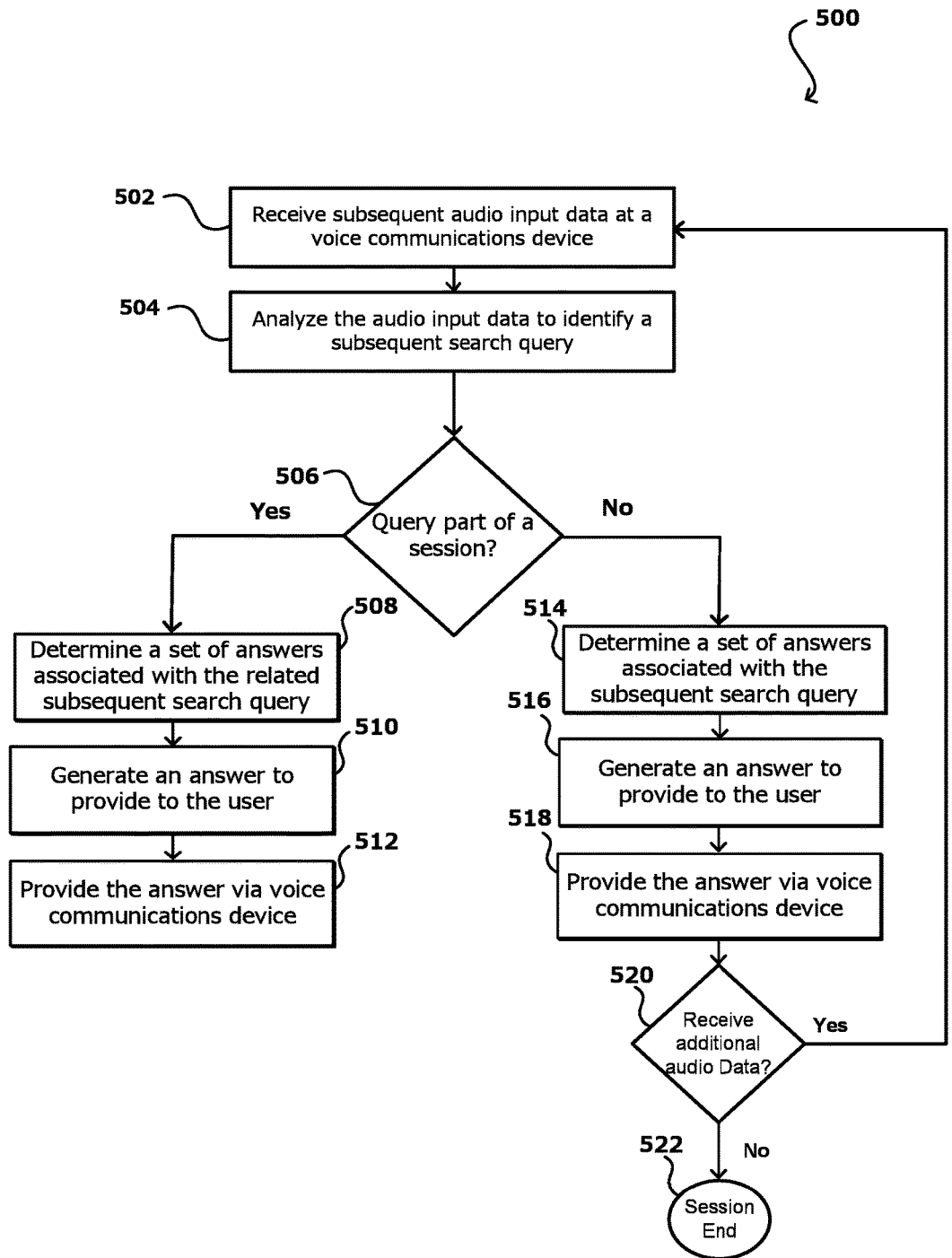
FIG. 5 illustrates an example process for using voice information to perform a subsequent voice search in accordance with various embodiments.

As described, the user may be interested in a variation of the answer provided or may desire to ask a question not related to the previous questions. In example process 500 of FIG. 5, the user may provide subsequent utterance including an instruction to the voice communications device. Accordingly, the voice communications device may receive 502 subsequent audio input data using the microphone and may transmit subsequent audio input data to the speech processing service of the service provider. The speech processing service may analyze 504 the audio input data to identify a subsequent search query (e.g., a speech question). The speech processing service makes a determination 506 as to whether the subsequent search query is part of a session associated with an earlier search query. In the situation where it is determined that the subsequent search query is part of the session, the search service can determine 508 a set of answers associated with the related subsequent search query. Similar methods of identifying the set of answers may be implemented as those described above. The set of answers can be summarized 510 or otherwise tailored based on a set of criteria. Similar methods of summarizing and tailoring the set of answers be implemented as those described above. The service provider may cause one or more answers (e.g., summarized answers) to be provided 512 to the user in a similar manner as described above.

Determining that the subsequent search query is part of the session can include identifying that the search query is similar to the previous search query, determining whether the user is revisiting an earlier question they did not get the correct answer to by re-asking a same or similar question, and/or any other signs that the user is asking a question based on an earlier question.

In the situation the subsequent search query is not part of the session, the search provider can process the subsequent unrelated search query to determine 514 a set of answers associated with the subsequent unrelated search query and may use the answers associated with the questions to generate 516 an answer to provide to the user as described above. Thereafter, the voice communication device can provide 518 (e.g., speak back to the user) the most relevant answer(s) to the user or a modified version of the answer(s) (e.g., a summary of the answer(s), a tailored version of the answer(s), etc.) The service provider may wait to determine whether additional audio input data is received 520 in regards to the latest provided results of the new search query and/or the subsequent set of search results. If additional audio input data is received, the process returns to step 502 and the process is repeated until no further additional audio input data is received. However, if a predetermined period of time elapses and no additional audio input data is received, the session may be ended 522 and the voice communications device may go to sleep or be deactivated.

Figure 6:
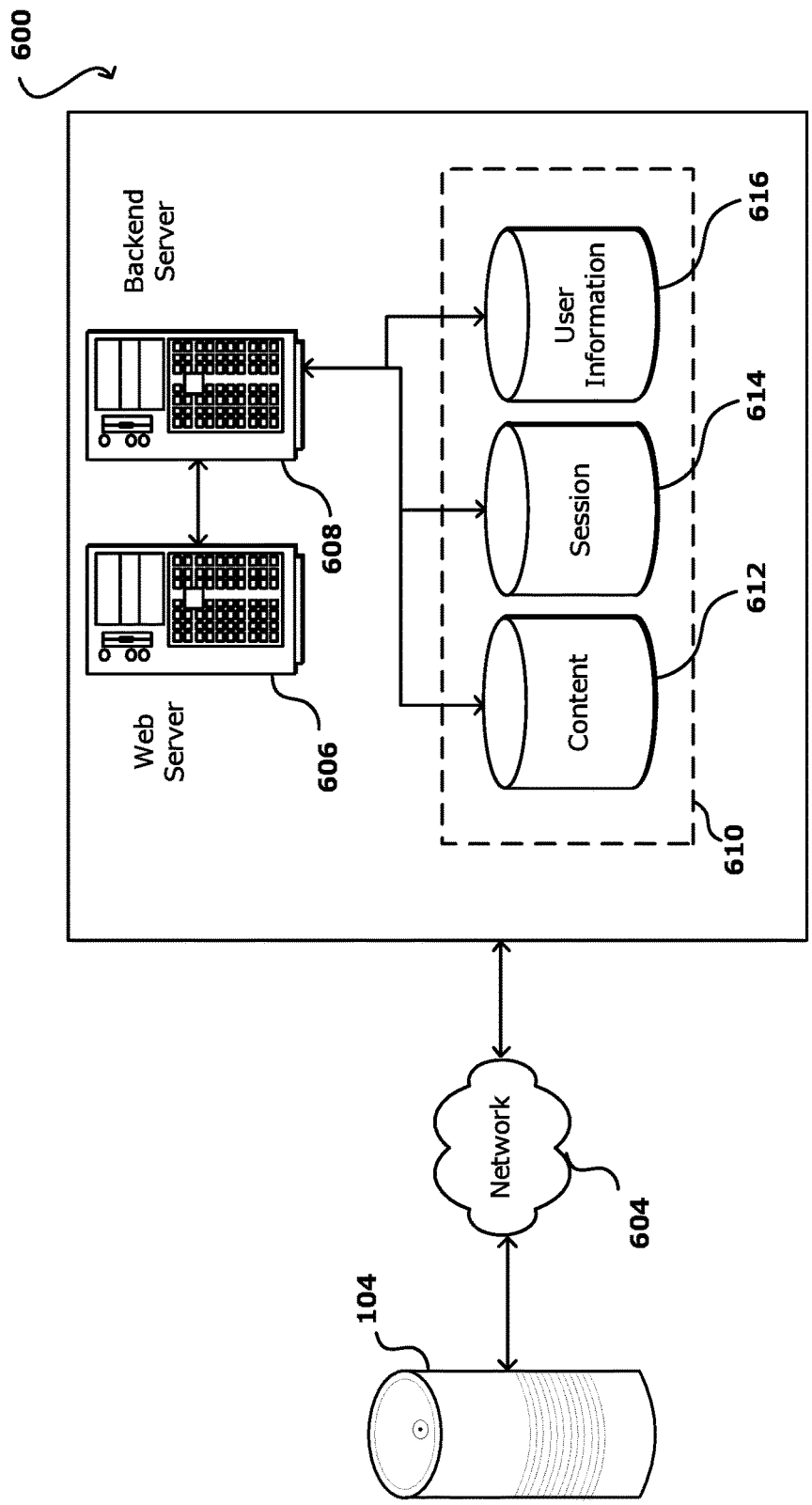
FIG. 6 illustrates an example environment in which various embodiments can be implemented.

In accordance with various embodiments, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes voice communications device 104, which can include any appropriate device operable to send and receive requests, messages or information over network 604 and convey information back to an appropriate device. The network can include any appropriate network, including a telephone network provided by a telecommunication operator, an intranet, the Internet, a cellular network, a local area network, wireless network, or any other such network or combination thereof. Communication over the network can be enabled via wired or wireless connections and combinations thereof. In this example, the network includes the Internet, as the environment includes a Web server 606 for receiving requests and serving content in response thereto, although for other networks, an alternative device serving a similar purpose could be used, as would be apparent to one of ordinary skill in the art.

The illustrative environment includes at least one backend server 608 and a data store 610. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 608 can include any appropriate hardware and software for integrating with the data store 610 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 606 in the form of HTML, XML or another appropriate structured language in this example. The handling of all requests and responses, as well as the delivery of content between the voice communications device 104 and the backend server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing content (e.g., production data) 612 and user information 616, which can be used to serve content for the production side. The data store is also shown to include a mechanism for storing log or session data 614. It should be understood that there can be other information that may need to be stored in the data store, such as page image information and access rights information, which can be stored in any of the above listed mechanisms as appropriate or in additional mechanisms in the data store 610. In one example, a user can initiate a search request associated with a search query using a voice communications device. In this case, the data store might access the content information to identify matching search results to the search query and may access search query mapping information to identify a ranking of questions based on relevance scores to the search query to determine a set of answers. The data store 610 is operable, through logic associated therewith, to receive instructions from the backend server 608 and obtain, update or otherwise process data in response thereto. In one such example, the voice communications device can receive a request to refine the playback of media content, such as music, news, audio books, audio broadcasts, and other such content. In this case, the data store might access the user information to verify the identity of the user and access a media service to determine media content the user is associated with. The user's speech can be analyzed and used to generate an updated active play queue or initiate the playback of media content.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Figure 7:
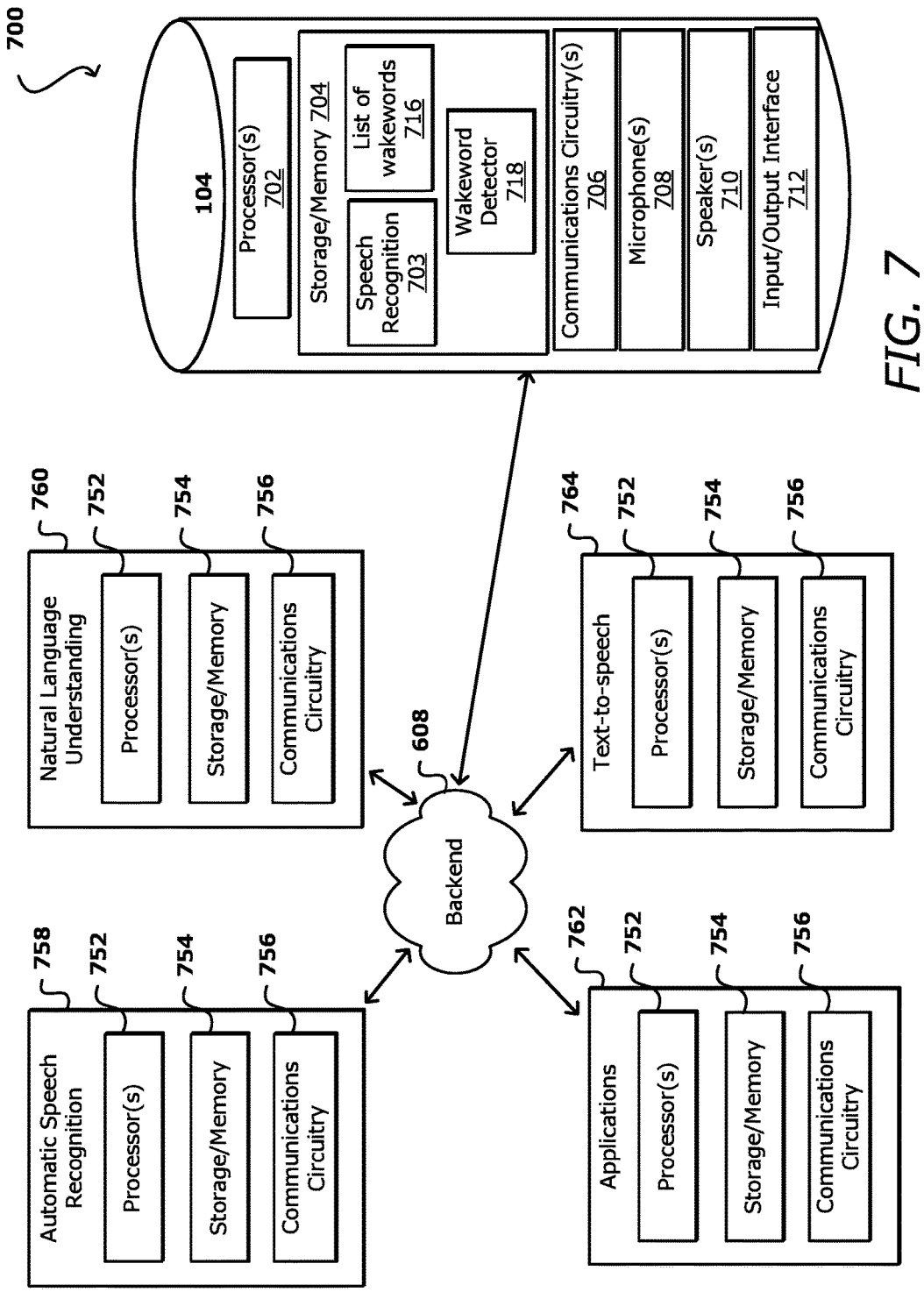
FIG. 7 illustrates an example for sending electronic communications between electronic devices.

FIG. 7 is another example environment 700 for implementing aspects in accordance with various embodiments. In this example, voice communications device 104, in some embodiments, may correspond to any type of electronic device capable of being activated in response to detecting a specific sound. Voice communications device 104 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. In some embodiments, voice communications device 104 may be relatively simple or basic in structure such that no mechanical input option(s) (e.g., keyboard, mouse, trackpad) or touch input(s) (e.g., touchscreen, buttons) may be provided. For example, voice communications device 104 may be capable of receiving and outputting audio, and may include power, processing capabilities, storage/memory capabilities, and communication capabilities.

Voice communications device 104 may include a minimal number of input mechanisms, such as a power on/off switch, however primary functionality, in one embodiment, of voice communications device 104 may solely be through audio input and audio output. For example, voice communications device 104 may listen for a wakeword by continually monitoring local audio. In response to the wakeword being detected, voice communications device 104 may establish a connection with backend server 608, send audio input data to backend server 608, and await/receive a response from backend server 608. In some embodiments, however, non-voice-enabled devices may also communicate with backend server 608 (e.g., push-to-talk devices).

Voice communications device 104 may include one or more processors 702, storage/memory 704, communications circuitry 706, one or more microphones 708 or other audio input devices (e.g., transducers), one or more speakers 710 or other audio output devices, as well as an optional visual input/output ("I/O") interface 712. However, one or more additional components may be included within voice communications device 104, and/or one or more components may be omitted. For example, voice communications device 104 may include a power supply or a bus connector. As another example, voice communications device 104 may not include a visual I/O interface. Furthermore, while multiple instances of one or more components may be included within voice communications device 104, for simplicity only one of each component has been shown.

Processor(s) 702 may include any suitable processing circuitry capable of controlling operations and functionality of voice communications device 104, as well as facilitating communications between various components within voice communications device 104. In some embodiments, processor(s) 702 may include a central processing unit ("CPU"), a graphic processing unit ("GPU"), one or more microprocessors, a digital signal processor, or any other type of processor, or any combination thereof. In some embodiments, the functionality of processor(s) 702 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 702 may include its own local memory, which may store program modules, program data, and/or one or more operating systems. However, processor(s) 702 may run an operating system ("OS") for voice communications device 104, and/or one or more firmware applications, media applications, and/or applications resident thereon.

Storage/memory 704 may include one or more types of storage mediums such as any volatile or non-volatile memory, or any removable or non-removable memory implemented in any suitable manner to store data on voice communications device 104. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 704 may be implemented as computer-readable storage media ("CRSM"), which may be any available physical media accessible by processor(s) 702 to execute one or more instructions stored within storage/memory 704. In some embodiments, one or more applications (e.g., gaming, music, video, calendars, lists, etc.) may be run by processor(s) 702, and may be stored in memory 704.

In some embodiments, storage/memory 704 may include one or more modules and/or databases, such as speech recognition module 703, list of wakewords database 716, and wakeword detection module 718. Speech recognition module 703 may, for example, include an automatic speech recognition ("ASR") component that recognizes human speech in detected audio. Speech recognition module 703 may also include a natural language understanding ("NLU") component that determines user intent based on the detected audio. Also included within speech recognition module 703 may be a text-to-speech ("TTS") component capable of converting text to speech to be outputted by speaker(s) 710, and/or a speech-to-text ("STT") component capable of converting received audio signals into text to be sent to backend server 608 for processing.

List of wakewords database 716 may be a database stored locally on voice communications device 104 that includes a list of a current wakeword for voice communications device 104, as well as one or more previously used, or alternative, wakewords for voice communications device. In some embodiments, user 102 may set or program a wakeword for voice communications device 104. The wakeword may be programmed directly on voice communications device 104, or a wakeword or words may be set by the individual via a backend server application (app) that is in communication with backend server 608. For example, a user may use their mobile device having the backend server application running thereon to set the wakeword. The specific wakeword may then be communicated from the mobile device to backend server 608, which in turn may send/notify voice communications device 104 of the individual's selection for the wakeword. The selected activation may then be stored in list of wakewords database 716 of storage/memory 704.

Wakeword detection module 718 may include an expression detector that analyzes an audio signal produced by microphone(s) 708 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 708. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 708. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice communications device 104 may then begin sending the audio signal to backend server 608 for detecting and responds to subsequent utterances made by user 102.

Communications circuitry 706 may include any circuitry allowing or enabling voice communications device 104 to communicate with one or more devices, servers, and/or systems. For example, communications circuitry 706 may facilitate communications between voice communications device 104 and backend server 608. Communications circuitry 706 may use any communications protocol, such as any of the previously mentioned exemplary communications protocols. In some embodiments, voice communications device 104 may include an antenna to facilitate wireless communications with a network using various wireless technologies (e.g., Wi-Fi, Bluetooth, radiofrequency, etc.). In yet another embodiment, voice communications device 104 may include one or more universal serial bus ("USB") ports, one or more Ethernet or broadband ports, and/or any other type of hardwire access port so that communications circuitry 706 allows voice communications device 104 to communicate with one or more communications networks.

Voice communications device 104 may also include one or more microphones 708 and/or transducers. Microphone(s) 708 may be any suitable component capable of detecting audio signals. For example, microphone(s) 708 may include one or more sensors for generating electrical signals and circuitry capable of processing the generated electrical signals. In some embodiments, microphone(s) 708 may include multiple microphones capable of detecting various frequency levels. As an illustrative example, voice communications device 104 may include multiple microphones (e.g., four, seven, ten, etc.) placed at various positions about voice communications device 104 to monitor/capture any audio outputted in the environment where voice communications device 104 is located. The various microphones 708 may include some microphones optimized for distant sounds, while some microphones may be optimized for sounds occurring within a close range of voice communications device 104.

Voice communications device 104 may further include one or more speakers 710. Speaker(s) 710 may correspond to any suitable mechanism for outputting audio signals. For example, speaker(s) 710 may include one or more speaker units, transducers, arrays of speakers, and/or arrays of transducers that may be capable of broadcasting audio signals and or audio content to a surrounding area where voice communications device 104 may be located. In some embodiments, speaker(s) 710 may include headphones or ear buds, which may be wirelessly wired, or hard-wired, to voice communications device 104, that may be capable of broadcasting audio.

In some embodiments, one or more microphones 708 may serve as input devices to receive audio inputs, such as speech. Voice communications device 104, may then also include one or more speakers 710 to output audible responses. In this manner, voice communications device 104 may function solely through speech or audio, without the use or need for any input mechanisms or displays.

In one exemplary embodiment, voice communications device 104 includes I/O interface 712. The input portion of I/O interface 712 may correspond to any suitable mechanism for receiving inputs from a user of voice communications device 104. For example, a camera, keyboard, mouse, joystick, or external controller may be used as an input mechanism for I/O interface 712. The output portion of I/O interface 712 may correspond to any suitable mechanism for generating outputs from voice communications device 104. For example, one or more displays may be used as an output mechanism for I/O interface 712. As another example, one or more lights, light emitting diodes ("LEDs"), or other visual indicator(s) may be used to output signals via I/O interface 712 of voice communications device 104. In some embodiments, one or more vibrating mechanisms or other haptic features may be included with I/O interface 712 to provide a haptic response to user 102 from voice communications device 104. Persons of ordinary skill in the art will recognize that, in some embodiments, one or more features of I/O interface 712 may be included in a purely voice-enabled version of voice communications device 104. For example, one or more LED lights may be included on voice communications device 104 such that, when microphone(s) 708 receive audio from user 102, the one or more LED lights become illuminated signifying that audio has been received by voice communications device 104. In some embodiments, I/O interface 712 may include a display screen and/or touch screen, which may be any size and/or shape and may be located at any portion of voice communications device 104. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

FIG. 7 also includes backend server 608, as mentioned previously, which may be in communication with voice communications device 104. Backend server 608 includes various components and modules including, but not limited to, automatic speech recognition ("ASR") module 758 (which may include, for example, speech-to-text ("STT") functionality), natural language understanding ("NLU") module 760, applications module 762, and text-to-speech ("TTS") module 764. In some embodiments, backend server 608 may also include computer readable media, including, but not limited to, flash memory, random access memory ("RAM"), and/or read-only memory ("ROM"). Backend server 608 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used.

ASR module 758 may be configured such that it recognizes human speech in detected audio, such as audio captured by voice communications device 104, which is then sent to backend server 608. ASR module 758 may include, in one embodiment, one or more processor(s) 752, storage/memory 754, and communications circuitry 756. Processor(s) 752, storage/memory 754, and communications circuitry 756 may, in some embodiments, be substantially similar to processor(s) 702, storage/memory 704, and communications circuitry 706, which are described in greater detail above, and the aforementioned descriptions of the latter may apply. NLU module 760 may be configured such that it determines user intent based on the detected audio received from voice communications device 104. NLU module 760 may include processor(s) 752, storage/memory 754, and communications circuitry 756.

Applications module 762 may, for example, correspond to various action specific applications or servers capable of processing various task specific actions. Applications module 762 may further correspond to first party applications and/or third party applications operable to perform different tasks or actions. For example, based on the context of audio received from voice communications device 104, backend server 608 may use a certain application to perform an action, such as searching for a search query. Applications module 762 may include processor(s) 752, storage/memory 754, and communications circuitry 756. As an illustrative example, applications module 762 may correspond to a search query application. The search query application of the applications module 762 can be associated with a customer account. The customer account can include at least one profile stored in, for example, user information 616 in FIG. 6 that can be linked to the search query application in applications module 762. Audio input data can be received at automatic speech recognition module 758 from voice communications device 104. The automatic speech recognition module 758 can use automatic speech recognition (ASR) techniques on the audio input data to generate text data of the audio input data. The natural language understanding module 760 can use natural language understanding (NLU) techniques on the text data to determine a search query e.g., speech question. The application module may include one or more modules of the search service provider 240 of FIG. 2 and the corresponding functionality described herein. The question can be used to query an index of stored questions to determine a set of candidate questions best matching the user's question. The candidate questions are associated with answers, and one or more answers can be combined, summarized, refined, or otherwise processed to determine an answer most relevant to the user's question. Thereafter, the voice communications device 104 can provide (e.g., speak back to the user) the most relevant answer(s) to the user or a modified version of the answer(s) (e.g., a summary of the answer(s), a tailored version of the answer(s), etc.) using speaker 710.

TTS module 764 may employ various text-to-speech techniques. It should be noted that techniques for taking text and converting it into audio input data that can represent speech are well known in the art and need not be described in further detail herein, any suitable computer implemented techniques may be used. TTS module 764 may also include processor(s) 752, storage/memory 754, and communications circuitry 756.

Persons of ordinary skill in the art will recognize that although each of ASR module 758, NLU module 760, applications module 762, and TTS module 764 include instances of processor(s) 752, storage/memory 754, and communications circuitry 756, those instances of processor(s) 752, storage/memory 754, and communications circuitry 756 within each of ASR module 758, NLU module 760, applications module 762, and STT/TTS module 764 may differ. For example, the structure, function, and style of processor(s) 752 within ASR module 758 may be substantially similar to the structure, function, and style of processor(s) 752 within NLU module 760, however the actual processor(s) 752 need not be the same entity.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   a computing device processor;
   a memory device including instructions that, when executed by the computing device processor, enable the computing system to:
   receive audio input data corresponding to an utterance received by a microphone of a voice communications device;
   identify a user account associated with the voice communications device;
   determine an action, a recipient, and search terms for a question from the audio input data by performing speech recognition on the audio input data;
   query, based in part on the action, an index using the search terms to determine a set of questions with associated answers based at least in part on a relevance function, the index including a plurality of questions with corresponding answers, the relevance function taking into consideration information associated with the recipient;
   determine a ranking for each question in the set of questions based at least in part on respective relevance scores;
   identify a set of answers associated with questions in the set of questions having a highest relevance score;
   calculate an associated weighting factor for each answer in the set of answers based at least in part on information associated with the user account, wherein the information includes at least one of search history information, purchase history information, or user preference information;
   summarize the set of answers to generate a summarized answer, the summarized answer based at least in part on at least one of the highest relevance score or the associated weighting factor for each answer in the set of answers; and
   cause the summarized answer to be transmitted to the voice communications device, the summarized answer being presented via the voice communications device.

2. The computing system of claim 1, wherein the summarized answer includes a first answer portion from a first answer associated with a first website and a second answer portion from a second answer associated with a second website.

3. The computing system of claim 1, wherein the instructions, when executed further enable the computing system to:
   use a sentence compression technique on the set of answers to generate the summarized answer.

4. A computing system, comprising:
a computing device processor;
a memory device including instructions that, when executed by the computing device processor, enable the computing system to:
receive audio input data that includes a search request from an utterance received to a voice communications device;
identify a user account associated with the voice communications device;
determine, from speech recognition performed on the audio input data, an action, a recipient, and a search query that is included in the search request;
query, based in part on the action, an index using the search query to identify a set of queries based at least in part on a relevance function, each query of the set of queries associated with a respective response that is associated with a relevance score, the relevance function taking into consideration information associated with the recipient;
identify a set of responses associated with the set of queries;
calculate an associated weighting factor for each response in the set of responses based at least in part on information associated with the user account, wherein the information includes at least one of search history information, purchase history information, or user preference information;
summarize the set of responses to generate a summarized response, the summarized response based at least in part on at least one of the highest relevance score or the associated weighting factor for each response in the set of responses; and
cause the summarized response to be transmitted to the voice communications device, the summarized response being presented via the voice communications device.

5. The computing system of claim 4, wherein the summarized response includes at least a first response portion from a first response associated with a first website and a second response portion from a second response associated with a second website.

6. The computing system of claim 5, wherein the instructions, when executed further enable the computing system to:
use a sentence compression technique to generate a summary of the first response portion and the second response portion; and
cause the summary of the first response portion and the second response portion to be presented via the voice communications device.

7. The computing system of claim 5, wherein the instructions, when executed further enable the computing system to:
identify a user identity of a user based at least in part on an audio signature in the audio input data; and
use a sentence compression technique to generate a summary of the first response portion and the second response portion based at least in part on the user identity.

8. The computing system of claim 4, wherein the search request is a first search request, and wherein the instructions, when executed further enable the computing system to:
receive a second search request, the second search request associated with second audio input data from the voice communications device;
analyze the index to determine a second set of responses; and
cause a second response of the second set of responses to be transmitted to the voice communications device, the second response being presented via the voice communications device.

9. The computing system of claim 8, wherein the first search request and the second search request are received during a session with the voice communications device.

10. The computing system of claim 9, wherein an end of the session is determined by an amount of time between the summarized response being presented and receiving the second search request.

11. The computing system of claim 9, wherein an end of the session is determined by a user input.

12. The computing system of claim 4, wherein the instructions, when executed further enable the computing system to:
receive a second search request, the second search request associated with second audio input data from the voice communications device;
analyze the index to determine that a second set of responses is not available; and
submit the second search request to an answer service for potential answers.

13. The computing system of claim 12, wherein the potential answers for the second search request are provided by one of users of a provider environment, moderators of the provider environment, software-based approaches.

14. The computing system of claim 4, wherein the summarized response includes information for a related product or service.

15. The computing system of claim 4, wherein the index is an inverted index and includes at least one or sets of words or word phrases from one of question and answer websites, product support websites, product support discussion boards, user comments associated with products offered through an electronic marketplace, or user comments associated with one of a website, a product, or a service.

16. A method, comprising:
receiving audio input data that includes a search request from an utterance received to a voice communications device;
identifying a user account associated with the voice communications device;
determining, from speech recognition performed on the audio input data, an action, a recipient, and a search query that is included in the search request;
querying, based in part on the action, an index using the search query to identify a set of queries based at least in part on a relevance function, each query of the set of queries associated with a respective response that is associated with a relevance score, the relevance function taking into consideration information associated with the recipient;
identifying a set of responses associated with the set of queries;
calculating an associated weighting factor for each response in the set of responses based at least in part on information associated with the user account, wherein the information includes at least one of search history information, purchase history information, or user preference information;
summarize the set of responses to generate a summarized response, the summarized response based at least in part on at least one of the highest relevance score or the associated weighting factor for each response in the set of responses; and causing the summarized response to be transmitted to the voice communications device, the summarized response being presented via the voice communications device.

17. The method of claim 16, wherein the summarized response includes at least a first response portion from a first response associated with a first website and a second response portion from a second response associated with a second website, the method further including:

using a sentence compression technique to generate a summary of the first response portion and the second response portion; and causing the summary of the first response portion and the second response portion to be presented via the voice communications device.

18. The method of claim 16, wherein the summarized response includes at least a first response portion from a first response associated with a first website and a second response portion from a second response associated with a second website, the method further including:

identifying a user identity based at least in part on an audio signature in the audio input data; and using a sentence compression technique to generate a summary of the first response portion and the second response portion based at least in part on the user identity.

19. The method of claim 16, wherein the search request is a first search request, the method further comprising:

receiving a second search request, the second search request associated with second audio input data from the voice communications device;

analyzing the index to determine a second set of responses; and causing a second response of the second set of responses to be transmitted to the voice communications device, wherein the first search request and the second search request are received during a session with the voice communications device.

* * * * *